UNITED STATES PATENT OFFICE 2,279,421

COCCIDIOSIS CONTROL

Wendell Holmes Tisdale, Wilmington, Del., assignor to E. I. du Pont de Nemours & Company, Wilmington, Del., a corporation of Delaware No Drawing. Application August 8, 1939, Serial No. 288,990

11 Claims. (Cl. 167—53.1)

This invention relates to pest control and is particularly directed to methods and means for controlling coccidiosis, especially in poultry, by introducing into the intestinal tract prior to infection a composition which contains as an active ingredient tetraethylthiuram monosulfide.

Coccidiosis is a protozoan disease which is quite prevalent and destructive among chickens, turkeys, pigeons, geese, rabbits, sheep, cattle, pigs, mink and cats. Many other animals including man are susceptible to the disease. The coccidia (Eimeria and Isospora) infect various organs but particularly the digestive tract of their host and cause definite lesions and often cause stunting, weakness and death. The coccidia multiply within the infected organs and undergo certain development after being passed in the excrement.

The micro-organism, coccidium, is very resistant and no treatment is available. Preventives now available are not entirely satisfactory irrespective of whether the point of attack is internal or external treatment. External control requires strict sanitation and constant vigilance, which are difficult to obtain and only partially effective. Internal control likewise has proved relatively ineffective, since compounds, for the most part, which are sufficiently toxic to affect the micro-organisms likewise adversely affect the fowl. Countless of the known poisons have been evaluated for this purpose without success, notwithstanding that intensive research has been conducted over the major portion of the last century in an effort to find means for curbing and controlling the ravages of the disease. Even at this late date the disease is wide-spread and constitutes one of the major problems confronting the poultry industry.

Various products containing sulfur have recently been suggested and have been made available for the treatment of coccidiosis. It has been shown, however, that some of these products, at least are injurious to the chickens, in some cases producing death and in others a calcium deficiency in the bones (rickets).

It has now been found that tetraethylthiuram monosulfide is effective in controlling coccidiosis and that it can be fed in admixture with the feed or drinking water or otherwise introduced into the intestinal tract of the animal being treated in dosages sufficient to prevent development of the disease and yet insufficient to have any deleterious effect upon the animal being treated. It has been determined by competent investigation that up to forty times the amount of tetraethylthiuram monosulfide known to be effective for coccidiosis control is non-injurious to chickens.

The treatment is in the nature of a preventive treatment. It does not cure infected chickens and will not prevent the disease after infection unless administered within a reasonable time, e. g., two and one-half hours, after the coccidia enters the body. It has been found impossible, however, to infect chickens after administering tetraethylthiuram monosulfide in suitable doses whether injected directly into the intestines or cecal pouches or mixed with the food fed the chickens or included in the drinking water, and whether administered as such or in the emulsion hereinafter to be described.

For example, as little as 0.08 cubic centimeter of tetraethylthiuram monosulfide has been found effective in treating chickens from four weeks of age to laying hens. As much as 4 cubic centimeters can be tolerated in single doses. It is best, however, if the dosage does not exceed 0.2 cubic centimeter if administered daily, or 0.5 cubic centimeter if administered every other day. For chickens under 4 weeks of age half doses may be administered. Chickens under two weeks of age may be given a minimum dose, e. g., 0.08 cubic centimeter, at one week of age.

It appears that the effectiveness of tetraethylthiuram monosulfide may be associated with its oil-soluble property and its liquid (very viscous) form. Possibly these properties permit uniform absorption and distribution in the intestinal tract whereby maximum effectiveness against the micro-organism is obtained with minimum effect on the host. In any event, the oil-insoluble thiuram sulfides tested were not effective in non-lethal doses and the less oil-soluble and solid (crystalline) tetramethylthiuram monosulfide gave only partial protection in non-lethal doses. Thus, it may be possible to substitute for tetraethylthiuram monosulfide those thiuram sulfides having similar chemical and physical properties.

In some instances it would be desirable to administer the tetraethylthiuram monosulfide as an oil solution, preferably in an edible oil such as coconut, olive and cottonseed oils, and for ease of application and for administering the tetraethylthiuram monosulfide in the drinking water, the oil solution may be made up into a stable dispersible emulsion.

A composition which in extensive tests has proved highly effective in preventing development of coccidiosis in chickens contains 25 per cent tetraethylthiuram monosulfide and is prepared by dissolving 25 parts of tetraethylthiuram monosulfide in an equal quantity of coconut oil and emulsifying the solution with 2 parts sodium decyl sulfate and 48 parts of a solubilized casein solution consisting of 14 parts casein, 4 parts trisodium phosphate dodecahydrate, and 150 parts water, the parts being by weight. The tetraethylthiuram monosulfide in this composition may be replaced wholly or in part by other thiuram sulfides having similar properties, such as tetra-(2-ethyl-hexyl)-thiuram disulfide and tetrabutylthiuram monosulfide which, like tetraethylthiuram monosulfide, are viscous liquids, at ordinary temperatures and are soluble in an equal quantity of coconut oil.

This composition may be dispersed in the drinking water, mixed in the feed, or introduced directly into the intestinal tract. In case a wet mash is fed the emulsion may be dispersed in the water used for preparing the mash. A suitable dosage is from 1 to 5 cubic centimeters, and if repeated daily 0.6 to 1 cc. The minimum dosage is preferred and even smaller doses may be used.

A preferred manner of administering the treatment is to disperse the thiuram sulfide in the feed. This is best accomplished by mixing into the feed tetraethylthiuram monosulfide or an oil solution of the thiuram sulfide, either as such or in the form of the emulsion described above. The quantity of liquid thus introduced is limited to that which can be adsorbed or absorbed by the feed particles, and within the limits of up to 10 per cent liquid the packing and handling characteristics of the feed will not be essentially impaired.

The proportion of thiuram sulfide to feed as well as the nature of the feed itself will vary according to the age of the chicken and the different methods of feeding, and also on whether the feed containing the thiuram sulfide constitutes the entire ration or only part of it and whether it is fed continuously or intermittently. Those skilled in the art will be able to judge, in view of the dosages given above, what concentrations are more suitable and what method of feeding is most desirable under the particular conditions obtaining.

For general feeding where the feed constitutes the principal ration any suitable mixed feed containing 0.075 to 0.25 per cent tetraethylthiuram monosulfide may be employed with satisfactory results. Preferably, the thiuram sulfide content is so adjusted that the amount ingested is near the minimium dosage, e. g., 0.08 cc.

A mash suitable for general feeding can be prepared by thoroughly mixing the thiuram sulfide with ground (crushed or cracked) yellow corn in amounts to give a product containing about 0.2 per cent tetraethylthiuram monosulfide and then mixing this product with other ingredients according to the following (or other suitable) composition:

|  | Pounds |
|---|---|
| Ground yellow corn | 45 |
| Standard wheat middlings | 15 |
| Wheat bran | 15 |
| Meat scraps | 8 |
| Dried milk | 8 |
| Alfalfa leaf meal | 5 |
| Limestone grit | 1.5 |
| Granite grit | 1.5 |
| Salt | 0.5 |
| Cod liver oil | 1 |
| Tetraethylthiuram monosulfide | 0.09 |

If other rations are given simultaneously the quantity of thiuram sulfide should be increased accordingly.

Another suitable preparation may be prepared by dissolving tetraethylthiuram monosulfide in cod liver oil in suitable amounts, e. g., 7 to 20 per cent by weight. Such a solution may be fed in any convenient manner, such as in a general feed of the type given above, and the expedients adopted to insure proper dosing of cod liver oil will also insure proper dosing of tetraethylthiuram monosulfide.

To obtain uniform dosing in general feeding care need be taken to effect uniform distribution of the thiuram sulfide in the feed. I have found that this result can easily and most satisfactorily be obtained by treating the feed or a part of it, such as the grain (i. e., the major constituent—usually corn) with a dilute aqueous emulsion of the thiuram sulfide so as to obtain a substantially uniform coating over the particles treated. The emulsion may be applied by dipping or spraying or in a suitable mixer and may be applied before or after grinding or crushing. A suitable method is to spray the cracked or ground corn as it is discharged from the crusher or grinder with an emulsion of suitable concentration to give the desired thiuram sulfide content in the feed.

When conditions are such that incorporation of thiuran sulfide in the general feed does not offer adequate control of the thiuram sulfide dosage it will be found desirable to use an emulsion as described above and to administer the remedy in the drinking water or in a wet mash. Alternatively, a special feed may be prepared for use in supplementing general feeding. For example, a feed containing 0.25 to 5 per cent tetraethylthiuram monosulfide and the balance yellow corn may be used to supplement the rations of chickens regardless of whether they are young chicks, fryers, pullets, laying hens or capons, and may be safely offered according to the dosages previously given.

The compositions given above are intended by way of illustration and not as limiting the invention, it being understood that numerous variations may be made without departing from the spirit of the invention or the scope of the appended claims.

This application is in part a continuation of my prior application Serial No. 197,373, filed March 22, 1938.

I claim:

1. An internal remedy for coccidiosis control comprising as its essential active ingredient tetraethylthiuram monosulfide dissolved in an edible oil.

2. An internal remedy for coccidiosis control which comprises as its essential active ingredient tetraethylthiuram monosulfide in solution in an edible oil.

3. An internal remedy for coccidiosis control consisting in a stable dispersible aqueous emulsion characterized in that the dispersoid contains tetraethylthiuram monosulfide.

4. An internal remedy comprising nutriment having tetraethylthiuram monosulfide dispersed therein.

5. A poultry feed comprising nutriment in admixture with tetraethylthiuram monosulfide in an amount exceeding 0.075 per cent by weight.

6. A poultry feed comprising nutriment in admixture with 0.075 to 0.25 per cent tetraethylthiuram monosulfide.

7. The method of controlling coccidiosis in animals susceptible to the disease which consists in introducing tetraethylthiuram monosulfide into the intestinal tract of the animal prior to infection.

8. In a process of preparing poultry feed, the step of treating at least the major constituent of the feed with a dilute aqueous emulsion the dispersoid of which contains tetraethylthiuram monosulfide whereby a uniform distribution of the thiuram sulfide in the feed is obtained.

9. The method of treating animals susceptible to coccidiosis to prevent development of macroscopic lesions in the intestinal tract of the animal after exposure to the organism causing the disease, which comprises introducing tetraethylthiuram monosulfide into the intestinal tract of the animal prior to infection in an amount not substantially in excess of the minimal dosage.

10. A coccidiosis control composition for internal application to prevent development of coccidiosis in animals susceptible to the disease which contains as its essential active ingredient tetraethylthiuram monosulfide.

11. The method of treating poultry to prevent development of macroscopic lesions in the intestinal tract of the animal after exposure to coccidiosis which comprises introducing tetraethylthiuram monosulfide into the intestinal tract of the animal prior to the infection in an amount not substantially in excess of the minimal dosage and in no case in excess of about 0.5 cubic centimeter.

WENDELL HOLMES TISDALE.